United States Patent [19]
Day et al.

[11] Patent Number: 6,111,542
[45] Date of Patent: Aug. 29, 2000

[54] ROTATING ELECTRONICALLY STEERABLE ANTENNA SYSTEM AND METHOD OF OPERATION THEREOF

[75] Inventors: Kevin Kristopher Day, Phoenix; Richard Scott Torkington, Mesa; John Wesley Locke, Tempe, all of Ariz.

[73] Assignee: Motorola, Inc., Schaumburg, Ill.

[21] Appl. No.: 09/055,453

[22] Filed: Apr. 6, 1998

[51] Int. Cl.[7] .................................................. H01Q 3/00
[52] U.S. Cl. .......................... 342/359; 343/757; 343/763; 343/882
[58] Field of Search ........................... 342/359; 343/757, 343/763, 766, 882

[56] References Cited

U.S. PATENT DOCUMENTS

| | | | |
|---|---|---|---|
| 4,675,681 | 6/1987 | Kinsey | 342/372 |
| 4,725,843 | 2/1988 | Suzuki et al. | 342/359 |
| 4,841,303 | 6/1989 | Anderson | 342/359 |
| 5,223,845 | 6/1993 | Eguchi | 342/359 |
| 5,357,259 | 10/1994 | Nosal | 342/398 |
| 5,519,409 | 5/1996 | Uematsu et al. | 343/771 |
| 5,552,798 | 9/1996 | Dietrich et al. | 343/893 |
| 5,619,215 | 4/1997 | Sydor | 343/766 |
| 5,734,356 | 3/1998 | Chang | 343/882 |

*Primary Examiner*—Thomas H. Tarcza
*Assistant Examiner*—Dao L. Pham
*Attorney, Agent, or Firm*—Jennifer B. Wuamett

[57] ABSTRACT

A user terminal (110) includes a rotating electronically steerable antenna system (210) which combines coarse mechanical beam steering with fine electronic beam steering to provide full hemispherical coverage and enable hand-offs in a satellite communication system. The antenna system (210) comprises at least one antenna unit (and preferably two antenna units) including a mechanically rotatable base (330), an antenna holder (320) coupled to the mechanically rotatable base, and two electronically steerable antenna subunit (310) mounted on the antenna holder. Antenna system (210) also includes an antenna unit controller (260) adapted to control rotation of the mechanically rotatable base (330).

31 Claims, 5 Drawing Sheets

ROTATING ELECTRONICALLY STEERABLE ANTENNA SYSTEM AND METHOD OF OPERATION THEREOF

FIELD OF THE INVENTION

This invention relates generally to the field of antennas, and more particularly to a rotating electronically steerable antenna system and method of operation thereof.

BACKGROUND OF THE INVENTION

In recent years, the telecommunication industry has seen the development and deployment of the first commercial nongeostationary orbit (NGSO) satellite constellations to respond to the rapidly expanding demand for global telecommunication services. Satellite communication systems incorporating such satellite constellations can be viewed as a global network of nodes having the potential to deliver a variety of information services to locations virtually anywhere in the world at a much lower cost than would be possible solely using prior art wireless and/or wire-based terrestrial networks. Among these satellite communication systems, use of satellite constellations designed with both polar and inclined orbits have been proposed.

To enable wide-spread use of such satellite-based communication systems to a variety of system users, system operators need to develop efficient, cost-effective, relatively small antennas for transmitting signals to and/or receiving signals from user terminals. Additionally, antennas for user terminals also need to provide other capabilities to enable uninterrupted communication with satellites, as discussed further below.

In NGSO satellite communication systems, satellites move at relatively rapid speeds over the surface of an underlying celestial body, such as the earth. As it sweeps over the surface of the earth, an NGSO satellite projects a satellite "footprint" made up of a number of radio frequency (RF) "beams" or "cells" toward system users located on or near the surface of the Earth. Because each NGSO satellite is visible to a particular user terminal only for relatively small increments of time (typically only for several minutes), communications having a duration of more than several minutes are handled through a "hand-off" process, which involves switching communication service between cells or beams of a single satellite footprint and between cells or beams of different satellites within the satellite communications system to ensure continuous communication.

Moreover, space-based communication systems must share a limited frequency spectrum. In the past, regulators have either exclusively licensed portions of spectrum to a system within a frequency band, or have licensed spectrum to multiple systems, designating one system as having priority to operate within a particular spectral band. One or more other systems may be required to avoid interfering with the system having such priority.

The desire to enhance the capacity of space-based communication systems has resulted in continuing evolution of antenna technology. For example, systems have been described which use phased array antennas for communicating with satellites of the system. However, prior art phased array antennas have required relatively large package sizes and are very costly.

Therefore, what is needed is a user terminal antenna system with maximum hemispherical coverage to provide satellite tracking and hand-off capability through a relatively small package available at a reasonable cost. What is further needed is a user terminal antenna which is operable in the context of a spectrum sharing scenario.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

DETAILED DESCRIPTION OF A PREFERRED EMBODIMENT

The present invention provides, among other things, a user terminal antenna system with maximum hemispherical coverage to provide satellite tracking and hand-off capability through a relatively small package available at a reasonable cost. The antenna system of the present invention also is capable of mitigating interference in the context of a spectrum sharing scenario.

These benefits, and more, are achieved, at least in part, by a novel antenna system which combines coarse mechanical beam steering with fine electronic beam steering. Coarse mechanical beam steering desirably is achieved through the use of a mechanically rotatable base, such as a robotic turntable, while fine electronic beam steering desirably is achieved through the use of electronically steerable antenna subunits, such as phased array antennas. The combination of coarse mechanical steering and fine electronic beam steering allows for full hemispherical coverage, facilitates satellite-to-satellite hand-offs, and enables interference mitigation in a spectrum sharing scenario. The arrangement of phased arrays in combination with a mechanically steered turntable allows the provision of an antenna system which is significantly smaller in size than either prior art phased array antenna designs or mechanically controlled antenna dishes. The relatively small package size of the antenna system of the present invention along with the use a relatively low number of phased arrays provides the potential for significant reduction in cost over prior art phased array antennas.

Figure 1:
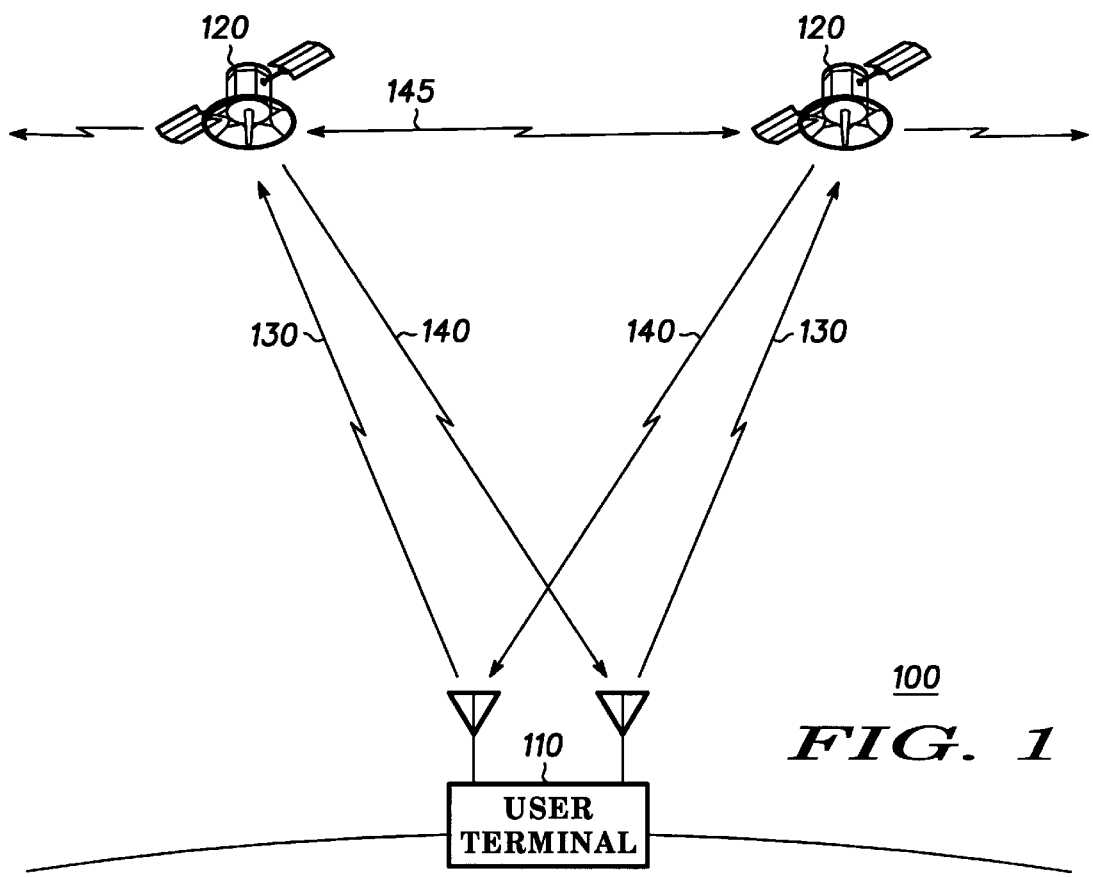
FIG. 1 illustrates a simplified diagram of a communication system in accordance with a preferred embodiment of the present invention.

FIG. 1 illustrates a simplified diagram of a communication system in accordance with a preferred embodiment of the present invention. Communication system 100 comprises at least one user terminal 110 and multiple satellites 120. Generally, communication system 100 can be viewed as a network of nodes. All nodes of communication system 100 desirably are or can be in data communication with other devices dispersed throughout the world through terrestrial networks and/or other conventional terrestrial user terminals coupled to communication system 100 through user terminal 110.

System 100 could include as few as a single satellite 120 or many satellites 120 in a constellation orbiting a celestial body, such as the earth. In alternate embodiments of the present invention, system nodes could be devices other than satellites 120. For example, a node could be a ground-based or aircraft-mounted transceiver. In addition, some of the advantages of the present invention could be realized where the node is stationary. Also, the present invention is applicable to satellite communication systems having satellites which orbit the earth at any angle of inclination including polar, equatorial, inclined, or other orbital pattern. The invention also is applicable to systems where full coverage of the earth is not achieved. Additionally, the invention is particularly applicable to systems where multiple coverage of portions of the earth occurs (e.g., more than one satellite is in view of a particular point on the earth's surface at the same time).

Satellites 120 maintain one or more communication pathways or links with user terminal 110, such as transmit links 130 from user terminal 110 to satellite 120 and/or receive links 140 to user terminal 110 from satellite 120. Satellites 120 also desirably communicate with other adjacent satellites 120 via optical inter-satellite links (ISLs) 145 to provide a global communication. In alternate embodiments, different types of links (e.g., radio frequency (RF) links) can be used. Thus, data from one user terminal 110 located on or near the surface of the earth can be routed through a satellite or a constellation of satellites to within range of substantially any other point on the surface of the earth. However, ISLs 145 are not necessary in the present invention. In an alternative embodiment, a communication can be routed down to or up from any one of many earth-based terminals through a bent pipe configuration (not shown).

In a preferred embodiment, system 100 provides fixed satellite services with a variety of user data rates to a variety of type of user terminals 110, including for example, small, very small, and ultra-small satellite earth terminals. It also can provide high data rate connections to gateway earth terminals that interface to the public switched telephone network (PSTN).

User terminal 110 could be positioned on, below, near, or above the surface of a celestial body (e.g., earth). Although one user terminal 110 is shown in FIG. 1, system 100 can accommodate any number of user terminals 110. User terminals 110 can be any one of numerous devices capable of transmitting and/or receiving information or data through system 100, such as, for example, mobile or stationary telephones, radios, computers or similar devices. Thus, user terminals 110 could be either continuously or intermittently mobile or positioned in a permanent location, such as a home or a building. Moreover, user terminals 110 can comprise video transmitters, facsimile machines, and/or computers capable of sending and/or receiving e-mail messages, to name a few. User terminals 110 can be individual ground-based customer premises units or a primary communication system control facility. However, to facilitate ease of discussion, user terminal 110 desirably is a terrestrial ground-based terminal located at a selected position upon the surface of the earth.

In a preferred embodiment, user terminal 110 maintains one or more communication links, such as transmit links 130 and receive links 140, with one or more satellites 120. Links 130, 140 desirably use a limited portion of the electromagnetic spectrum that is divided into numerous channels. Links 130, 140 preferably use a portion of L-Band, K-Band, or S-Band frequency channels or combinations thereof, and can encompass Frequency Division Multiplex Access (FDMA), Time Division Multiple Access (TDMA) and/or Code Division Multiple Access (CDMA) communications or combinations thereof. Other access methods can be used as known to those of ordinary skill in the art.

In a preferred embodiment of the present invention, satellites 120 are located in nongeostationary orbits (NGSO). In NGSO, satellites 120 move at relatively high speeds relative to user terminals 110, which are located proximate to the earth.

Figure 2:
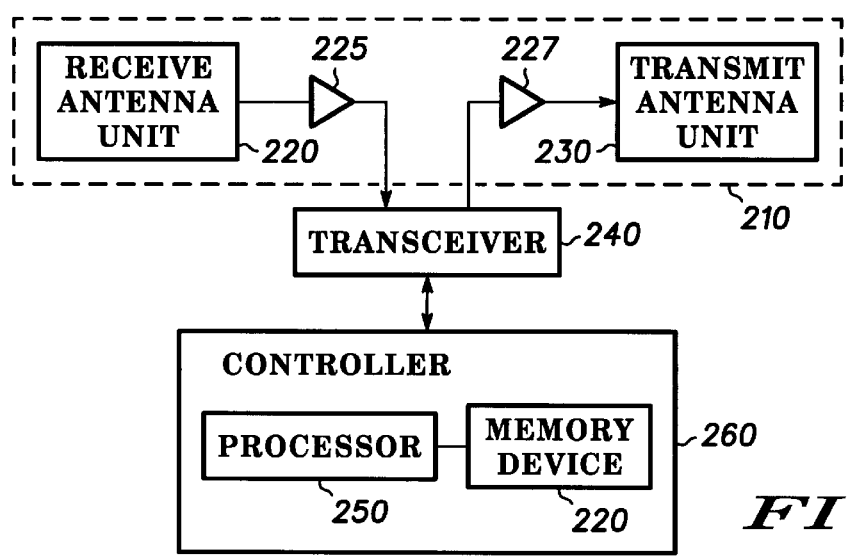
FIG. 2 illustrates a simplified block diagram of a user terminal in accordance with a preferred embodiment of the present invention.

FIG. 2 illustrates a simplified block diagram of a user terminal in accordance with a preferred embodiment of the present invention. User terminal 110 includes at least one antenna system 210, at least one transceiver 240 which is coupled to antenna system 210, and at least one antenna unit controller 260 coupled to transceiver 240. In a preferred embodiment of the present invention, antenna system 210 includes two antenna units, receive antenna unit 220 and transmit antenna unit 230. User terminal 110 also desirably includes other components for interfacing with one or more system users; however, those other components are not critical to the present invention and are not shown in FIG. 2.

Antenna controller 260 includes at least one memory device 270 coupled to processor 250. Antenna controller 260 is in communication with receive antenna unit 220 and transmit antenna unit 230. Receive antenna unit 220 and transmit antenna unit 230 also are coupled to transceiver 240. Antenna controller 260 implements control functions which cause antenna units 220, 230 to form antenna beams with desired characteristics. Controller 260 also controls movement or rotation of receive antenna unit 220 and transmit antenna unit 230 for tracking satellites 120 (FIG. 1) as discussed in further detail below with reference to FIGS. 3–10.

RF signals are transferred between antenna system 210 and transceiver 240. Although the signal path is illustrated as a single line, many interconnections are possible between antenna system 210 and transceiver 240.

Digital data signals are transferred between controller 260 and antenna units 220, 230. In receive mode, transceiver 240 desirably converts RF signals received from receive antenna unit 220 into digital data. In transmit mode, transceiver 240 desirably converts digital data obtained from antenna unit controller 260 into RF signals. RF signals are then sent to transmit antenna unit 230 by transceiver 240. RF signals received by transceiver 240 are converted to digital data which is sent to processor 250 to be further processed. Desirably, incoming signals pass from receive antenna unit 220 to transceiver 240 through low noise amplifier 225 and outgoing signals pass from transceiver 240 to transmit antenna unit 230 through high power amplifier 227. Digital signals also are transferred between processor 250 and transceiver 240.

Control signals are transferred between controller 260 and processor 250. Control signals can include signals to control functions which cause antenna units 220, 230 to form antenna beams with desired characteristics. Control signals also can include signals directing mechanical rotation of antenna units 220, 230 for coarse tracking of satellites, for fine electronic beam steering for tracking of satellites, or a combination of coarse and fine tracking of satellites. Such signals desirably are provided in accordance with information processed by processor 250. Such control signals could, for example, include instructions directing coarse mechanical rotation of receive antenna unit 220 or transmit antenna unit 230 to enable antenna units 220, 230 to track one or more satellites expected to be in view in accordance with information stored in memory device 270, which information relates to knowledge of the satellite constellation and the orbital path of the satellites therein in relation to a position of user terminal 110. Similarly, control signals could include instructions directing fine electronic steering of phased array elements in antenna units 220, 230 to enable tracking of satellite position via analysis of geolocation information communicated to the user terminal by the communication system and/or of signal strength or by other means know to those of skill in the art.

In a preferred embodiment of the present invention, receive antenna unit 220 and transmit antenna unit 230 are mounted on a roof or other outer structure of a building, such as a house or an office building, for example. Receive antenna unit 220 and transmit antenna unit 230 desirably are horizontally mounted and spaced at least 81 cm apart from each other to avoid interference, while the remaining elements of user terminal 110, including controller 260 and transceiver 240 desirably are situated within the building or structure and are in communication with antenna units 220, 230 through either wireless or wire based connections such as coaxial cables. In alternate embodiments, however, other elements of user terminal 110 also could be physically co-located with antenna units 220, 230. For example, all components of antenna system 210 could be located in a roof-mounted device. The precise relational location of the elements of user terminal 110 is not critical in the present invention.

Figure 3:
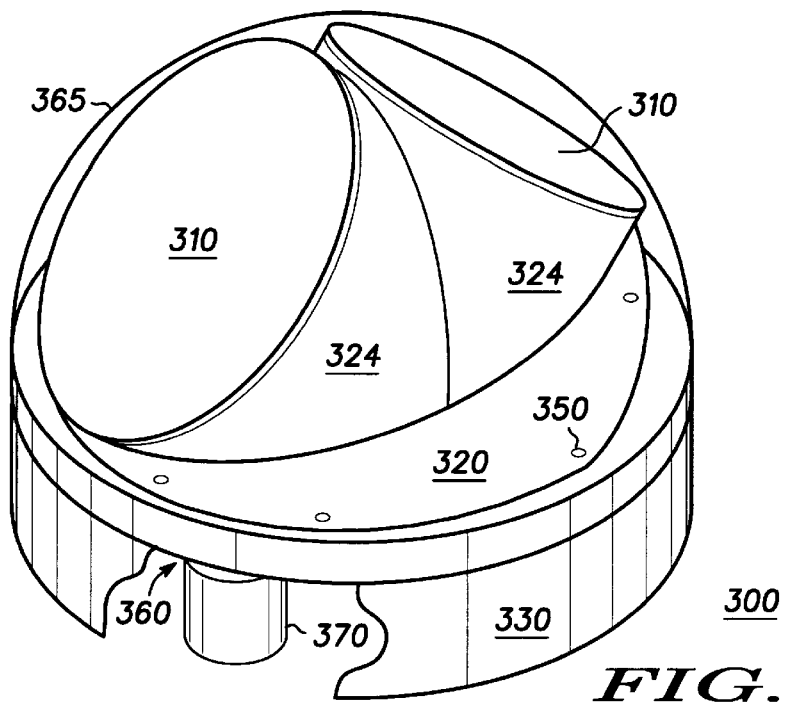
FIG. 3 illustrates a perspective view of an antenna unit in accordance with a preferred embodiment of the present invention.

FIG. 3 illustrates a perspective view of an antenna unit in accordance with a preferred embodiment of the present invention. Receive antenna unit 220 and transmit antenna unit 230 are antenna assemblies having essentially the same configuration. Antenna unit 300 described with reference to FIG. 3 is illustrative of the general elements of either receive antenna unit 220 (FIG. 2) or transmit antenna unit 230 (FIG. 2). Each antenna unit 300 includes two electronically steerable antenna subunits 310 mounted on antenna holder 320. Desirably, electronically steerable antenna subunits 310 are mounted on antenna holder 320 in a configuration substantially the same as shown in FIG. 3.

Antenna holder 320 desirably is comprised of molded plastic, but antenna holder 320 could be comprised of numerous other materials suitable for holding antenna subunits 310. Antenna holder 320 desirably is comprised of a shape substantially as shown in FIG. 3. More specifically, antenna holder 320 preferably has a substantially circular base 322 having two antenna subunit holders 324 projecting therefrom. Antenna subunit holders 324 each are shaped to have a surface for holding an electronically steerable antenna subunit 310, such as a phased array antenna unit, as described in more detail below with reference to FIGS. 4–5.

Antenna holder 320 is mounted on mechanically rotatable base 330 and connected thereto with fastening means 350. Fastening means could comprise any one or more of any numerous types of fasteners, such as, for example, one or more screws, bolts, snaps, or adhesive means such as glue and the like. The specific type of fastening means used to mount antenna holder 320 to base 330 is not critical in the present invention.

Base 330 desirably includes a robotic turntable capable of rotating in either a clockwise or counter clockwise direction as directed by antenna unit controller 260 (FIG. 2). Rotational motion of base 330 is effectuated by drive means 360 as discussed in further detail with reference to FIG. 4.

In a preferred embodiment of the present invention, radome 365 is used to cover and protect electronically steerable antenna subunits 310. In an alternate embodiment, radome 365 is not used. When used, radome 365 is comprised of plastic or other material penetrable by RF signals as known to those of ordinary skill in the art. The thickness of the material comprising radome 365 is appropriate for use with the frequency of signals expected to pass through radome 365. Thus, in a preferred embodiment of the present invention, the thickness of radome 365 is different for a radome used on receive antenna unit 220 and transmit antenna unit because in system 100 (FIG. 1) different frequencies are used on the uplink (to transmit signals from user terminals 110, FIG. 1) and on the downlink (when receiving signals from satellites 120, FIG. 1). However, in an alternate embodiment, radome 365 could have the same thickness when used on either receive antenna unit 220 or transmit antenna unit 230.

Figure 4:
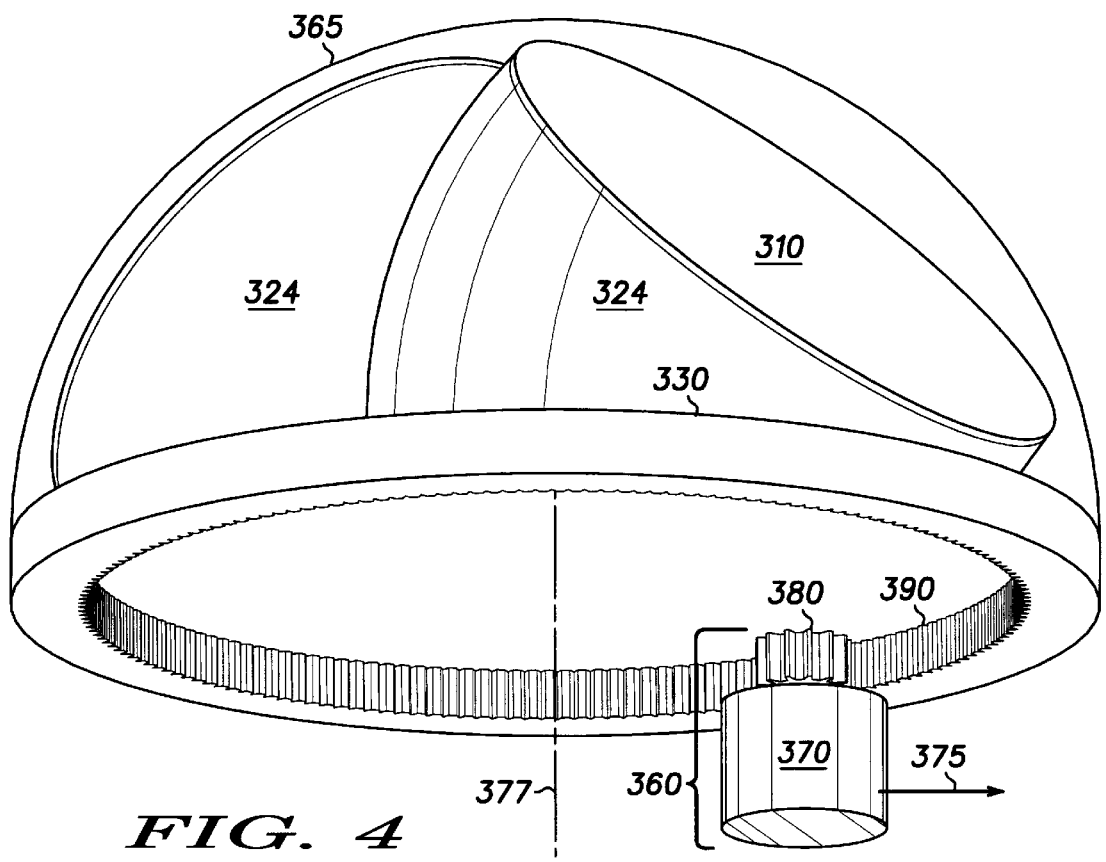
FIG. 4 illustrates a perspective view of a portion of an antenna unit in accordance with a preferred embodiment of the present invention.

FIG. 4 illustrates a perspective view of a portion of an antenna unit 300 (FIG. 3) in accordance with a preferred embodiment of the present invention. FIG. 4 presents a more detailed illustration of drive means 360. Drive means 360 executes rotational motion of base 330 thereby causing rotation of antenna holder 320 about axis of rotation 377. In a preferred embodiment of the present invention, drive means 360 includes motor 370, gear teeth element 380 extending from motor 370, and ribbed gear contact element 390. Motor 370 desirably is a stepper motor, but could be any of numerous other similar types of motors known to those of ordinary skill in the art. Antenna controller 360 (FIG. 2) communicates with motor through cable 375 or through some other appropriate communication mechanism (e.g., wireless channel, etc.). Motor desirably is electrically powered, but also could be battery powered, solar powered, or powered by other means known to those of ordinary skill in the art.

Ribbed gear contact element 390 desirably extends around an internal perimeter of base 330. In an alternate embodiments, however, ribbed gear contact element could extend around only a portion of a surface of base 330 and could be located on an outer perimeter of base 330. Moreover, the specific type of drive means 360 (FIG. 3) is not critical to the present invention. Thus, numerous types of drive means other than the gear-based drive means illustrated in FIGS. 3 and 4 could be used without departing from the spirit of the present invention. For example, drive means could include a friction-based drive system employing, for example, a rubber roller and rubber contact element or a belt drive mechanism rather than gear-based elements. Also, drive means other than motor 370 (FIGS. 3, 4) could be used to effectuate rotation, such as for example, hydraulic means or a linear actuator, to name a few.

In a preferred embodiment, antenna unit 300 is compact in size having a width of approximately 43 cm from end to end of the turn table base and a height of approximately 23 cm. These specific dimensions are not critical in the present invention, however, and antenna units could depart significantly from these specific dimensions without departing from the spirit of the present invention.

Figure 5:
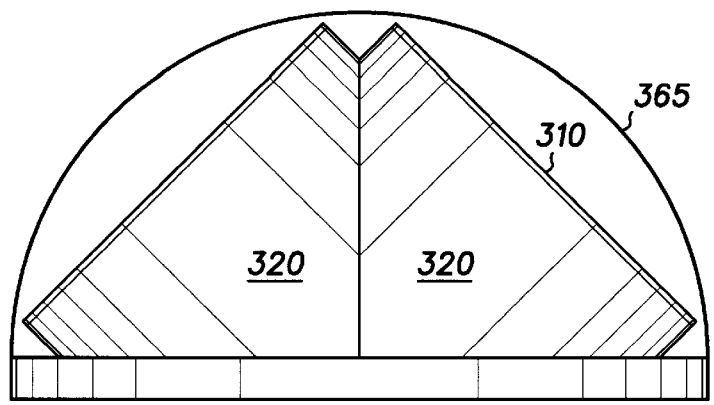
FIG. 5 illustrates a cross-sectional view of a portion of an antenna unit in accordance with a preferred embodiment of the present invention.

FIG. 5 illustrates a cross-sectional view of a portion of an antenna unit 300 in accordance with a preferred embodiment of the present invention. Dual electronically-steerable antenna subunits 310 desirably are included in each antenna unit 300. In other words, receive antenna unit 220 (FIG. 2) desirably has two electronically steerable antenna subunits 310 and transmit unit 230 also desirably has two electronically steerable antenna subunits 310. In a preferred embodiment, electronically steerable antenna subunits comprise phased array antennas. In an alternate embodiment of the present invention, however, electronically steerable antenna subunits 310 could be electronically steerable antenna subunits other than phased array antennas such as, for example, electronic reflector scanning elements as described in U.S. patent application Ser. No. 08/943,810 filed on Oct. 3, 1997, entitled "Electronic Scanning Reflector Antenna and Method for Using Same."

In a preferred embodiment of the present invention, phased arrays desirably are situated at 0° and 180° azimuth and 45° elevation. Antenna subunits 310 preferably have a pointing range of plus or minus 60° for an included angle of 120°, meaning that the coverage area of each antenna subunit 310 spans 60° in each direction from a vector drawn through a point at the center of an antenna subunit 310.

In a preferred embodiment of the present invention, electronically steerable antenna subunits 310 are substantially circular phased array antenna units having a diameter (FIG. 4) of approximately 25 cm. In alternate embodiments, antenna subunits 310 could vary in size and shape (e.g., antenna subunits 310 could be oval, square, rectangular, triangular, polygonal, or any one or more of numerous other geometric shapes). Similarly, antenna subunit holders 324 are adapted to provide a suitable mounting surface for antenna subunits 310. Thus, antenna subunit holders 324 desirably are cylindrical in shape and have a circular surface for holding antenna subunits 310. In alternate embodiments, antenna subunit holders could be formed in other shapes suitable for holding phased arrays of non-circular geometric shapes, such as those discussed above.

Antenna subunits 310 include a plurality of electronically-controllable phase-shifting elements coupled to RF outputs of an RF power distribution network (not shown). Such phased arrays (both receive and transmit) are commercially available from Raytheon, Texas Instruments, and others, and are well known to those of ordinary skill in the art.

Antenna system 210 (FIG. 2) also include suitable electronics (not shown) which are controlled by antenna unit controller 260 (FIG. 2) for applying desired electrical fields to a plurality of electrically controllable phase shifting elements. Preferably, phase-shifting elements are wave guide sections filled with at least one dielectric material. In a preferred embodiment, antenna subunits 310 contain a plurality of array elements which are independently controlled to produce a desired phase relationship to steer antenna beams in any direction over a wide angle field of view. This electronic steering of the phased array elements, which is referred to herein as "fine adjustment", desirably is accomplished by applying control voltages to electronically-controllable phase-shifting elements in electronically steerable antenna subunits 310. This fine adjustment allows antenna beam direction to be changed more quickly than mechanical movement of the antenna arrays. In the present invention, this fine adjustment is combined with coarse adjustment to improve tracking of satellites 120 (FIG. 1) in a LEO constellation in system 100 (FIG. 1) as described in further detail with reference to FIGS. 6–10.

Radome 365 is shown in FIG. 5, but as noted above, radome 365 could be absent in an alternate embodiment of the present invention.

Figure 6:
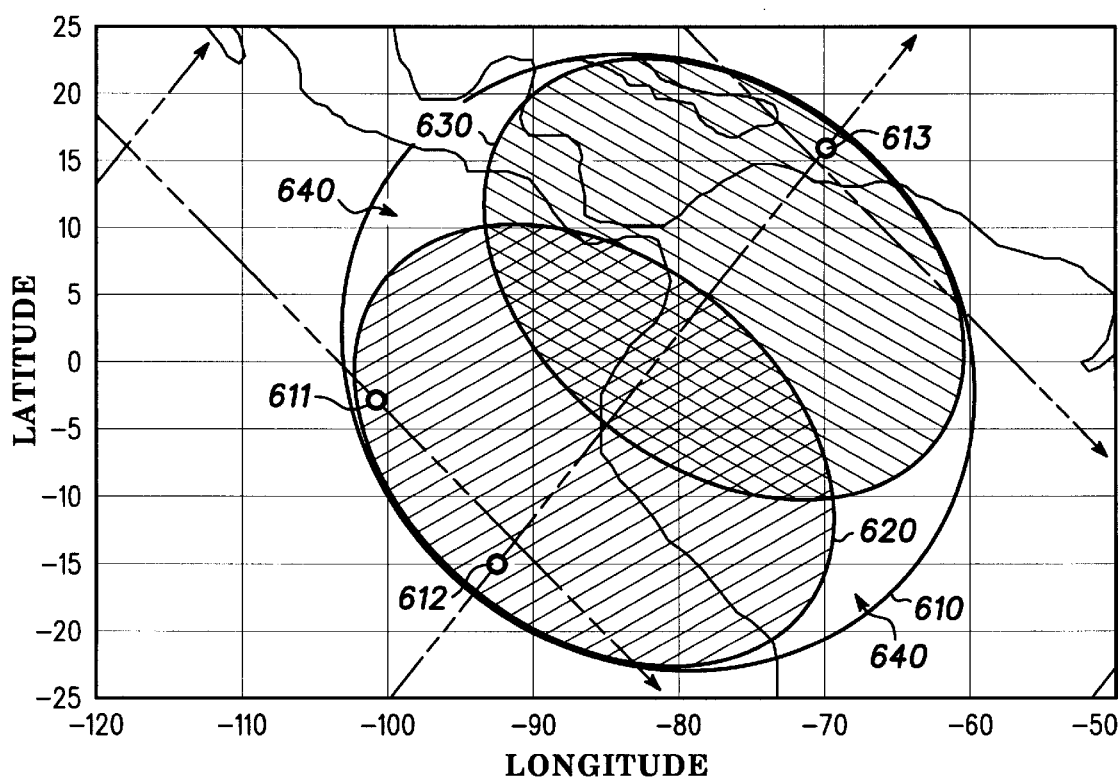
FIG. 6 illustrates an antenna projection of an antenna unit at a first position showing a first hand-off scenario.

FIG. 6 illustrates an area of coverage of an antenna unit at a first position showing a first hand-off scenario. As discussed further below, antenna unit 300 provides numerous advantages over prior art user terminal antenna devices through use of a combination of coarse mechanical rotation and fine electronic adjustment of the antenna pattern. First, for example, antenna unit 300 has maximized hemispherical coverage thereby maximizing the number of satellites available for communication in a situation where multiple satellites may be in view of a user terminal. Second, antenna unit 300 facilitates hand-offs, and in particular satellite-to-satellite hand-offs, by providing sufficient separation between a losing satellite (or satellite moving out of the field of view) and a gaining satellite (a satellite moving into the field of view of coverage area 610). Additionally, these advantages are achieved through a relatively non-obtrusive, relatively inexpensive antenna system.

FIG. 6 shows a coverage area 610 of a portion of the sky above the earth within a field of view of an antenna unit 300, such as receive antenna unit 220 (FIG. 2) or transmit antenna unit 230 (FIG. 2). Within coverage area 610, a first projection area 620 and a second projection area 630 are shown. Projection areas 620 and 630 represent a view of the sky that is seen by each antenna subunit 310 from a single antenna unit, such as receive antenna unit 220, and represents a potential coverage area for each electronically steerable antenna subunit 310. Similar patterns could be projected by transmit antenna unit 230 either simultaneously while receive antenna unit is projecting its beam patterns or at a different time. Coverage area also includes blind spots 640 representing an area where the beam pattern projected by antenna subunits 310 does not extend.

Maximized hemispherical coverage is achieved by combining coarse mechanical beam adjustment of the antenna projection areas 620, 630, with fine electronic beam steering within the projection areas, desirably through use of phased antenna arrays. By mechanically rotating antenna subunits 310 through rotation of base 330 (FIG. 3), the antenna unit's view of the sky changes thereby maximizing hemispherical coverage. This can be illustrated by comparing the antenna projection patterns and associated hand-off scenarios represented in FIGS. 6–8.

For example, FIG. 6 shows a first hand-off scenario. In FIG. 6, three satellites, 611, 612 and 613 are in view of antenna unit 300. Assume satellite 613 is serving as a node through which a user terminal, such as user terminal 110 (FIG. 1) associated with an antenna unit, such as antenna unit 300, communicates with a satellite communication system, such as system 100 at a first time (time 0). As shown in FIG. 6, satellite 613 is approaching an edge of projection area 630 and is about to move out of coverage area 610. Thus, antenna unit 300 will need to establish a communication link with another satellite through a hand-off procedure. Satellite 611 and satellite 612 both are visible within projection area 620 at a time interval represented in FIG. 6. However, user terminal 110 can communicate with only one of the satellites within projection area 620 because the beams of antenna subunit 310 can, in general, communicate with only one satellite at a time without causing interruption of ongoing communications. Thus, the antenna system, through direction from the user terminal and/or from one or more control systems of the communication system, selects one satellite of satellites 611 and 612 to which it will establish communication through a hand-off procedure.

In a preferred embodiment, the antenna system selects a preferred "hand-off satellite" (or incoming satellite with which it will establish a communication link) to be the satellite which will be in view for the longest period of time. Thus, in the hand-off scenario shown in FIG. 6, the antenna system selects satellite 612. The hand-off illustrated in FIG. 6 can be referred to as an "intraplane" hand-off as communications are handed off between a first and second satellite in the same "plane."

In an alternate embodiment, the antenna system could effect an interplane hand-off and/or could select a hand-off satellite based on different criteria, such as, for example, a satellite with which establishing a communication link will not cause interference with another communication system also having a satellite moving over the general area in which the hand-off is to occur. After the antenna system selects a hand-off satellite, it can establish a link with that satellite and then engage in a hand-off using hand-off procedures known to those of ordinary skill in the art. The steerable antenna subunits can then track satellite 612 through electronic steering as the satellite moves through coverage area 610. It should thus be apparent to one of ordinary skill in the art that the dual antenna subunit configuration of the antenna unit of the present invention facilities the hand-off process in mobile satellite communication systems. As described further with reference to FIGS. 7 and 8, the adaptation of antenna units 300 to be mechanically rotatable further facilitates the hand-off process.

Figure 7:
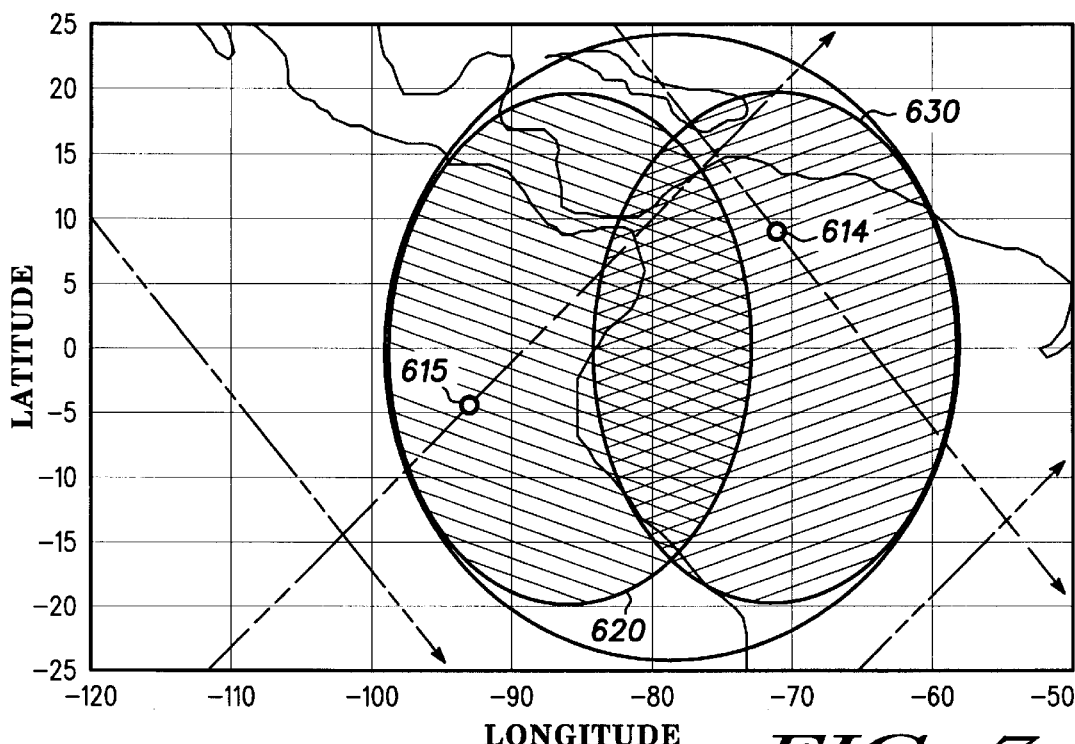
FIG. 7 illustrates an antenna projection of an antenna unit at a first rotated position showing a second hand-off scenario.

FIG. 7 illustrates an antenna projection of an antenna unit at a first rotated position showing a second hand-off scenario. The rotated view shown in FIG. 7 represents the antenna unit's view of the sky approximately 40 minutes later than the view shown in FIG. 6. During the 40 minute time lapse, the satellite constellation of the communication system has drifted (according to the view of the antenna unit). Thus, different satellites, satellites 614 and 615 are now in view of the antenna unit. As shown in FIG. 7, antenna subunits 310 have been rotated by approximately 45° from their position in FIG. 6. First satellite 614 n falls within projection area 630 of a first antenna subunit, while second satellite 615 falls within projection area 620 of a second antenna subunit. Thus, user terminal 110 could communicate with either first satellite 614 or second satellite 615, or both satellites 614, 615 at the same time (since the satellites are viewed from different projection areas of different electronically steerable antenna subunits). Also, this configuration facilitates an "interplane hand-off" (between satellites of different planes) when it becomes desirable to initiate hand-off procedures.

Figure 8:
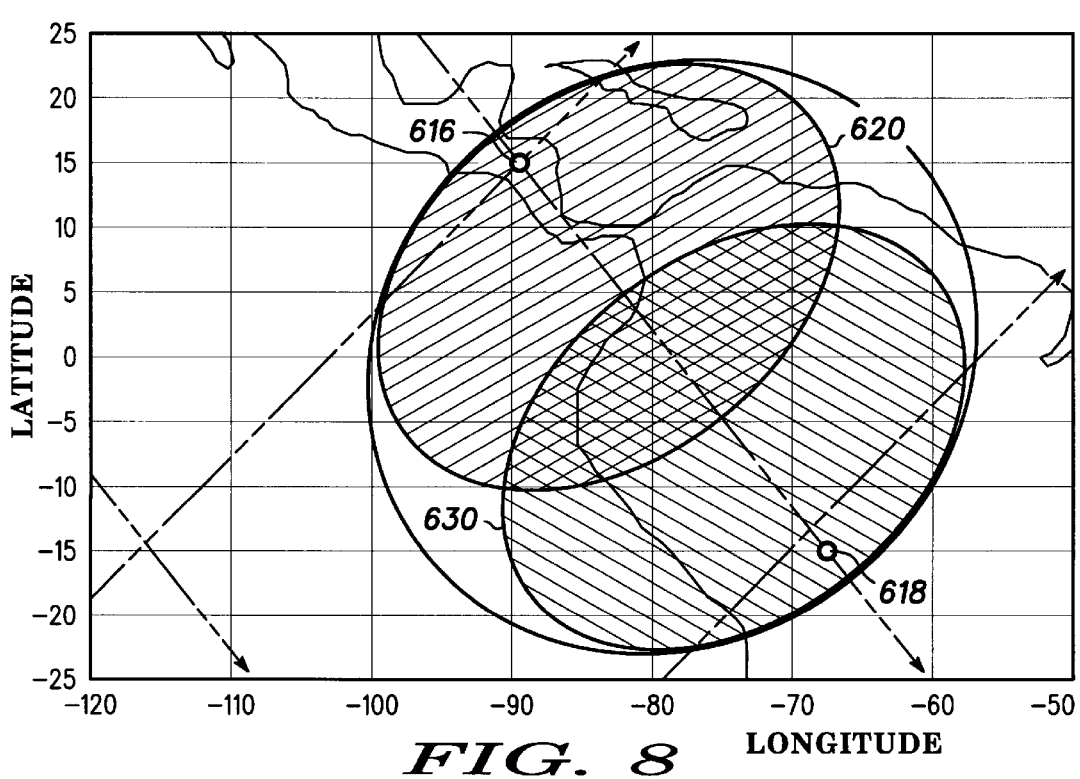
FIG. 8 illustrates an antenna projection of an antenna unit at a second rotated position showing a third hand-off scenario.

FIG. 8 illustrates an antenna projection of an antenna unit at a second rotated position showing a third hand-off scenario. In FIG. 8, the antenna unit has been rotated by approximately 90°, at a time approximately one hour and twenty minutes later than the view time represented by the view shown in FIG. 6 (which can be denoted as time zero). During this time, the satellite constellation has further drifted from the antenna unit's point of view, and the antenna unit's view of the sky is further changed. New satellites 616 and 618 now are in view. Satellite 618 is exiting the coverage area, and the antenna unit is poised to hand-off communications to satellite 616, which has recently entered the coverage area. Without having mechanically rotated the antenna unit between the positions represented in FIGS. 6 and 7 to the position represented in FIG. 8, satellite 616 would have fallen within a blind spot 640 (FIG. 6) while satellite 618 moved out of projection area 630; thus satellite 616 would not have been available for a hand-off.

Figure 9:
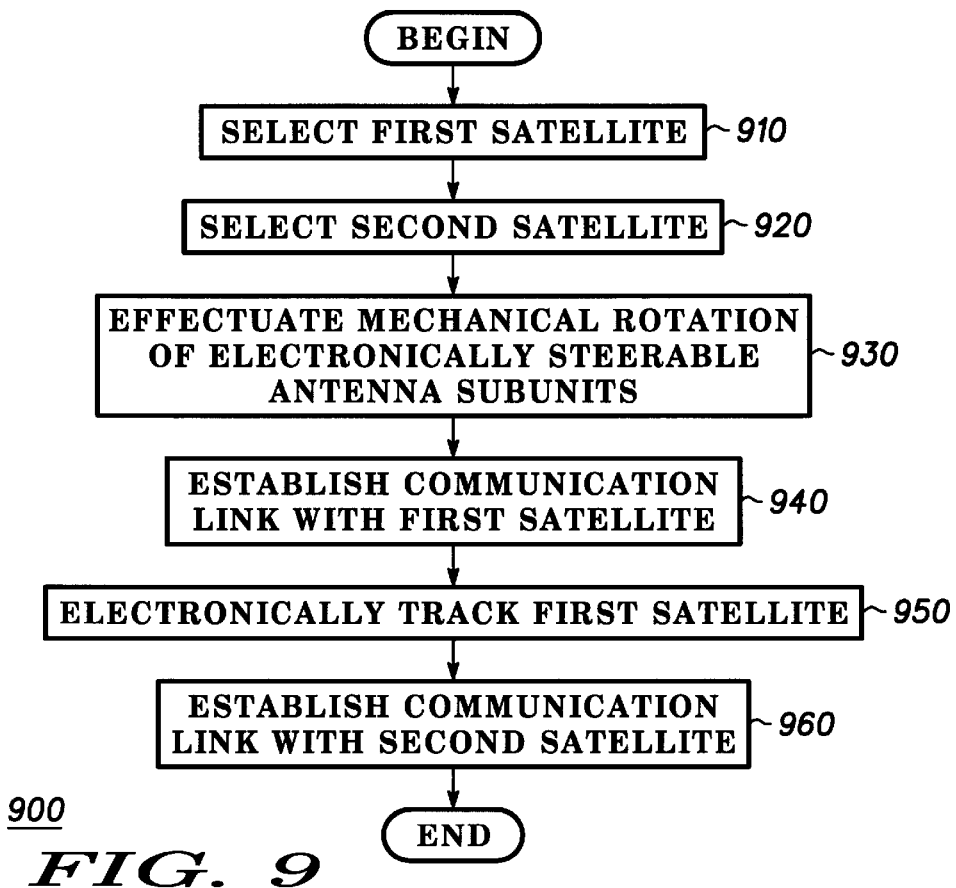
FIG. 9 illustrates a flow chart of a method for operating rotating electronically steerable antenna system in accordance with a preferred embodiment of the present invention.

FIG. 9 illustrates a flow chart of a method for operating rotating electronically steerable antenna system in accordance with a preferred embodiment of the present invention. Method 900 desirably is executed by a user terminal in a satellite communication system having multiple satellites. As discussed in more detail with reference to FIG. 2 above, user terminal 110 comprises at least one antenna unit including a mechanically rotatable base, an antenna holder coupled to the mechanically rotatable base, at least two electronically steerable antenna subunits mounted on the antenna holder. In a preferred embodiment, user terminal includes both receive antenna unit 220 and transmit antenna unit 230. However, method 900 is operable with only one antenna unit 300, which could be either a receive antenna unit or a transmit antenna unit. User terminal 110 also comprises an antenna unit controller coupled to the antenna unit.

Method 900 begins in step 910 when user terminal 110 selects a first satellite within a coverage area 610 (FIG. 6) of antenna unit 300 with which to establish a connection. In this step, user terminal 110, desirably through controller 260 (FIG. 2) selects one satellite within a field of view, or projection area, of a first electronically steerable antenna subunit. It is possible that at a given time, multiple satellites could be within a field of view of the first antenna subunit 310. For example, in FIG. 6, satellites 611 and 612 both fall within projection area 620, which represents the field of view of a first antenna subunit 310, such as a phased array antenna. However, user terminal desirably selects the satellite which has the potential to be within the field of view of the first antenna element for the longest time. This selection process desirably is carried out in antenna unit controller 260 (FIG. 2) of user terminal 110 based on algorithms executed by controller 260 using information concerning periodicity of the satellite constellation which is available to controller 260 on a real-time basis and/or through monitoring of signal strength and/or through analysis of information contained in memory device 270 (FIG. 2).

In step 920, a second satellite within coverage area 610 is selected in anticipation of establishing a link with the second satellite. In step 930, antenna unit controller 260 directs movement of mechanically rotatable base 330 (FIG. 3) so as to effectuate rotation of antenna holder 320 by an amount sufficient to place the first satellite within a field of view of a first electronically steerable antenna subunit and to place a second satellite within a field of view of a second electronically steerable antenna subunit. For example, referring back to FIG. 8, antenna holder 320 has been rotated from the position shown in FIG. 6 by an amount sufficient to place satellite 616 within projection area 620 of a first antenna subunit while placing satellite 618 within projection area 630 of a second antenna subunit.

Note that in step 930, antenna unit controller could determine that it is unnecessary to effectuate rotation before establishing a communication link with the first satellite. It is possible that at a particular time, the antenna unit is already poised in a position that will later facilitate a hand-off without effectuating rotation. Thus, step 930 could comprise directing the antenna unit to maintain its current position rather than directing movement to effectuate rotation.

In a preferred embodiment of the present invention, in step 930, mechanical rotation of the antenna holder is effectuated automatically in accordance with the periodicity of the satellite constellation of system 100. Rotation in accordance with the periodicity the satellite constellation can be achieved in a constellation of virtually any size and composition and can be achieved in either constellations where satellites orbit the earth at any angle of inclination including polar, equatorial, inclined, or other orbital pattern. For illustrative purposes consider a constellation which includes a (7×9) satellite constellation, or a constellation having seven inclined orbital planes each containing nine satellites. This exemplary (7×9) constellation has an included angle of approximately 90° between the orbital planes. Thus, in this example, mechanically rotatable base 330 (FIG. 3) could be adapted to be capable of 90° rotation. In alternate embodiments, however, mechanically rotatable base could be adapted to be capable of rotation of anywhere from 0° to 360° in accordance with the periodicity of a satellite constellation having an included angle other than the included angle described with reference to the preferred embodiment because the actual value of the included angle is not critical in the present invention.

In step 940, a communication link is established with the first satellite through the first electronically steerable antenna subunit. Alternatively, a communication link could be established with the second satellite through the second electronically steerable antenna subunit in this step.

In step 950, antenna unit 300 electronically tracks the first satellite as it moves within the projection area, or field of view, of the first electronically steerable antenna subunit. This is achieved in a preferred embodiment of the present invention by implementing fine electronic beam steering through use of a phased antenna array.

Method 900 can end at step 950. However, additional advantages can be achieved by executing further steps of method 900, as discussed further below.

Through steps 960 and 970, antenna system 210 (FIG. 2) can be operated to minimize hand-offs and, therefore, decrease the burden on the system that otherwise results from switching required to achieve frequent hand-offs. To maintain communication links in a mobile satellite communication system, it is necessary to switch, or "hand-off", the communication link or links from a first satellite to another satellite in clear line-of-sight of the user terminal. To avoid dropping a communication during the hand-off process, the user terminal establishes a connection with a second satellite before breaking its communication link with a first satellite. This process is referred to herein as a "make-before-break" connection. In a preferred embodiment of the present invention, hand-off capabilities are achieved while maximizing hemispherical coverage through maximizing the number of satellites available for communication.

Thus, in step 960, a communication link is established with a second satellite, such as satellite 616 (FIG. 8), through the second electronically steerable antenna subunit while maintaining the first communication link with the first satellite through the first electronically steerable antenna subunit. The communication link established in step 960 can comprise a "make-before-break" connection which is made in anticipation of executing a hand-off from the first satellite to the second satellite. Then, in step 970, a communication between system 100 and user terminal 110 could be handed-off from the first satellite to second satellite.

Note that the steps of method 900 are not necessarily in sequential order and could be reordered without departing from the scope of the present invention. For example, step 960 could before step 950 or even before step 930 in alternate embodiments of the present invention. Similarly, step 970 could be executed after step 950 if it is not critical that a make-before-break connection is established (e.g. for bursty transmissions that do not require a continuous link).

Figure 10:
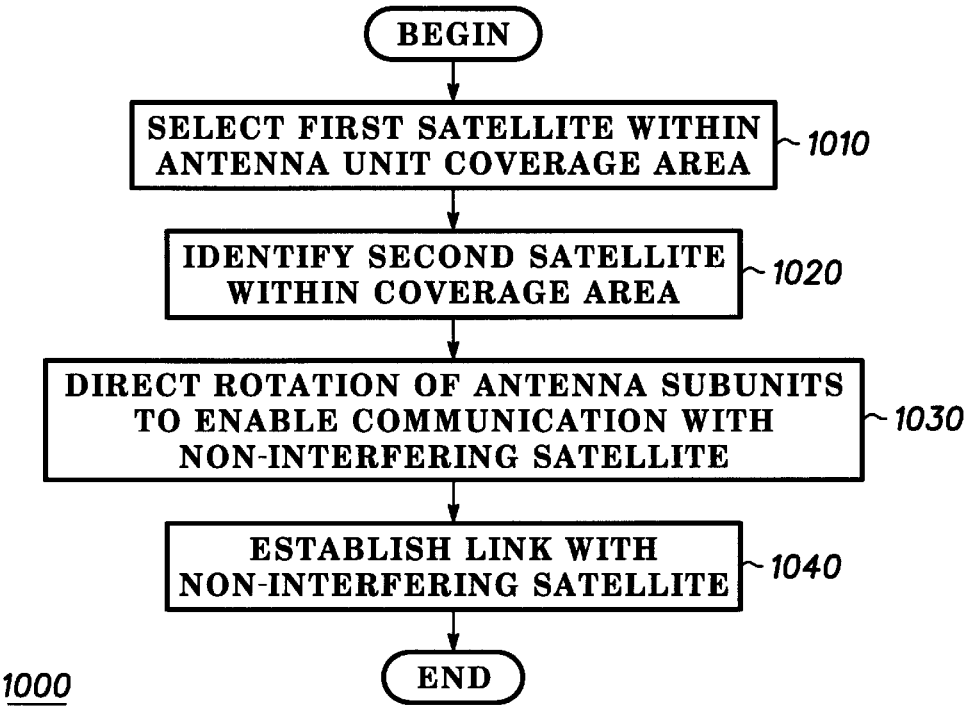
FIG. 10 illustrates a flow chart of a method for operating rotating electronically steerable antenna system in accordance with a preferred embodiment of the present invention.

FIG. 10 illustrates a flow chart of a method for operating rotating electronically steerable antenna system in accordance with a preferred embodiment of the present invention In this alternate embodiment, antenna system (210, FIG. 2) can be operated in a spectrum sharing scenario to mitigate potential interference with satellites of other satellite systems. In this embodiment, antenna subunits can be electronically steered to minimize interference and/or could be mechanically rotated to a position where one or both of the antenna subunits is situated to communicate with a satellite which would not cause interference with a satellite of another satellite communication system.

Method 1000 begins in step 1010, where antenna unit 300 (FIG. 3), in conjunction with antenna unit controller 260 (FIG. 2) selects a first satellite within a coverage area of the antenna unit in anticipation of establishing a communication link with the first satellite. In step 1020, antenna unit 300, in conjunction with antenna unit controller 260, identifies a second satellite within the coverage area, wherein the second satellite is a satellite of a second satellite communication system. In step 1030 antenna unit controller 260 then directs rotation of mechanically rotatable base 330 so as to effectuate rotation of said antenna holder by an amount sufficient to enable communication with a non-interfering satellite. In step 1040, a communication link is then established with the non-interfering satellite through the first electronically steerable antenna subunit, and signals can be transmitted between the non-interfering satellite and the user terminal without causing interference with the second satellite of the second communication system.

In a preferred embodiment, antenna unit 300 mitigate interference without effectuating rotation by exploiting its dual antenna subunit configuration. More specifically, rather than mechanically rotate the antenna unit to place a potentially interfering satellite outside a projection area of an antenna subunit, antenna unit 300 could exploit its electronic beam steering capabilities to mitigate interference by engaging in an "early hand-off" which would not otherwise be needed in the absence of the potential interference.

For example, referring to FIG. 7, assume that the user terminal is actively communicating in a first communication system through satellite 615. Satellite 615 (or more specifically RF signals being transmitted to satellite 615 through beams from an antenna unit associated with a user terminal), however, is moving within an area of interference of a second satellite of a second communication system, and continued communication to satellite 615 could cause interference with communications between one or more user terminal and the second satellite of the second satellite communication system. The antenna system could effectuate a hand-off to satellite 614 so as to prevent interference even though it would otherwise not yet be necessary to effectuate a hand-off. The hand-off could be made either for some temporary period of time until interference is no longer likely, at which time a link could be reestablished with satellite 615, or the hand-off could be more "permanent" such that the antenna unit would not reestablish a link with satellite 615 and would simply be handed-off to the next appropriate satellite as satellite 618 moved out of view.

In summary, the apparatus and method of the present invention enables provision of satellite data communications to consumers' homes and small offices through a light weight, antenna system which is relatively unobtrusive in size, as the antenna subunits are provided in a relatively dense package of two antenna subunits rather than using multiple circular subunits with multiple gaps therebetween as in prior art antenna systems. The rotatable electronically steerable antenna system of the present invention also can be provided at a fraction of the cost of prior art phased array antenna systems, which generally require relatively large package sizes and a substantial number of phased array subunits to achieve maximum hemispherical coverage.

Additionally, the antenna system of the present invention can be operated to facilitate hand-off capabilities in NGSO satellite systems by setting up make-before-break communication links. As discussed above, the antenna system of the present invention and the method of operation thereof also can mitigate interference in a spectrum sharing situation. Moreover, the use of separate receive and transmit antenna units in the antenna system of the present invention enables use of more efficient materials for radomes, or antenna protective covers. This is because such radomes can be made of material of a constitution and/or thickness which is particularly suitable to either transmit or receive frequencies (assuming such frequencies are different) rather than a compromise thickness which allows passage of signals of transmit or receive frequencies but is not ideal for either signal frequency.

The present invention has been described above with reference to a preferred embodiment. However, those skilled in the art will recognize that changes and modifications could be made in the described embodiments without departing from the nature and scope of the present invention. Various changes and modifications to the embodiment herein chosen for purposes of illustration will readily occur to those skilled in the art. For example, although the present invention was described with reference to a satellite communication system having a specific configuration and architecture, the antenna system of the present invention is not limited in applicability to the satellite communication system described herein and could be used in any satellite communication system which includes any number of mobile satellites traveling in any number of orbital planes in any inclination. To the extent that modifications and variations do not depart from the spirit of the invention, they are intended to be included within the scope thereof which is assessed only by a fair interpretation of the following claims.

What is claimed is:

1. An antenna system comprising:
   a first antenna unit comprising,
      a first mechanically rotatable base,
      an antenna holder coupled to said first mechanically rotatable base, and
      at least one electrically steerable antenna subunit mounted on said antenna holder;
   a second antenna unit comprising at least one electrically steerable antenna subunit mounted on a second mechanically rotatable base; and
   an antenna unit controller in communication with said first antenna unit and said second antenna unit, wherein said antenna unit controller is adapted to control rotation of said first mechanically rotatable base and said second mechanically rotatable base.

2. The antenna system as claimed in claim 1, wherein said first antenna unit comprises a receive antenna unit adapted to receive radio frequency (RF) signals, and wherein said second antenna unit comprises a transmit antenna unit adapted to transmit RF signals.

3. The antenna system as claimed in claim 1, wherein said first antenna unit comprises two electrically steerable antenna subunits mounted on said antenna holder.

4. The antenna system as claimed in claim 3, wherein said two electrically steerable antenna subunits each are mounted on said antenna holder at an elevation angle of approximately 45°.

5. The antenna system as claimed in claim 3, wherein said two electrically steerable antenna subunits each have a pointing range of plus or minus 60°.

6. The antenna system as claimed in claim 3, wherein said two electrically steerable antenna subunits comprise phased array antennas.

7. An antenna system comprising:
   a first antenna unit comprising,
      a first mechanically rotatable base,
      an antenna holder coupled to said first mechanically rotatable base, and
      at least two electrically steerable antenna subunit mounted on said antenna holder; and
   an antenna unit controller coupled to said first antenna unit, wherein said antenna unit controller is adapted to control rotation of said first mechanically rotatable base, said first antenna unit is a ground based antenna unit adapted to communicate with at least one satellite, and wherein said two electrically steerable antenna subunits are situated at approximately 0° and 180° azimuth on said antenna holder.

8. The antenna system as claimed in claim 6, wherein said phased array antennas comprise substantially circular arrays having a diameter of approximately 25 cm.

9. The antenna system as claimed in claim 6, wherein said phased array antennas have a geometric shape other than a substantially circular geometric shape.

10. The antenna system as claimed in claim 1, wherein said antenna unit controller is adapted to implement control functions which cause said first antenna unit to form antenna beams with desired characteristics.

11. The antenna system as claimed in claim 1, wherein said first mechanically rotatable base is comprised of a robotic turntable capable of a rotational motion in either a clockwise or counter clockwise direction.

12. The antenna system as claimed in claim 11, wherein said rotational motion of said robotic turntable is effectuated by a drive means.

13. The antenna system as claimed in claim 1, wherein said first antenna unit is covered by a radome.

14. The antenna system as claimed in claim 1, wherein said second antenna unit is covered by a radome.

15. An antenna system for use in a user terminal in a satellite communication system comprising a plurality of satellites, the antenna system comprising:
   a first antenna unit comprising,
      electrically steerable antenna means for receiving radio frequency (RF) signals from at least one satellite of said plurality of satellites,
      means for mounting said electrically steerable antenna means, and
      means for rotating said electrically steerable antenna means; and
   means for controlling rotation of said means for rotating to enable said electronically steerable receiving antenna means to enhance an amount of time during which a first satellite is within a projection region of said electrically steerable antenna means,
   a second antenna unit comprising, electrically steerable antenna means for transmitting radio frequency (RF) signals to said plurality of satellites, means for mounting said electrically steerable antenna means, and means for rotating said electrically steerable antenna means to enhance an amount of time during which a first satellite is within a projection region of said electrically steerable antenna means.

16. A user terminal for use in a satellite communication system, the user terminal comprising:

at least one antenna system comprising a first antenna unit and a second antenna unit, said first antenna unit and said second antenna unit each comprising, a mechanically rotatable base, an antenna holder coupled to said mechanically rotatable base, and at least two electronically steerable antenna subunits mounted on said mechanically rotatable base;

at least one transceiver coupled to said at least one antenna system; and at least one antenna unit controller in communication with said antenna system for controlling rotation of said mechanically rotatable base.

17. The user terminal as claimed in claim 16, wherein said antenna unit controller implements control functions which cause said first and second antenna unit to form antenna beams with desired characteristics.

18. The user terminal as claimed in claim 16, wherein said antenna system comprising a receive antenna unit and a transmit antenna unit comprises a transmit antenna unit.

19. A method for operating a rotatable electronically steerable antenna system in a user terminal in a satellite communication system having multiple satellites, wherein said user terminal comprises at least one antenna unit including a mechanically rotatable base, an antenna holder coupled to said mechanically rotatable base, at least two electronically steerable antenna subunits mounted on said antenna holder, and wherein said user terminal also comprises an antenna unit controller coupled to said at least one antenna unit, the method comprising the steps of:

(a) selecting a first satellite within a coverage area of a first antenna unit;

(b) selecting a second satellite within said coverage area;

(c) directing said mechanically rotatable base by said antenna unit controller so as to effectuate rotation of said antenna holder by an amount sufficient to place said first satellite within a field of view of a first electronically steerable antenna subunit of said first antenna unit and to place a second satellite within a field of view of a second electronically steerable antenna subunit; and (d) establishing a first communication link between said first satellite and said first antenna unit through said first electronically steerable antenna subunit.

20. The method as claimed in claim 19, wherein step (a) comprises the step of selecting a first satellite having a potential to remain within said coverage area for an amount of time which is longer than a potential amount of time during which another satellite within said coverage area is expected to remain within said coverage area.

21. The method as claimed in claim 19, wherein said satellite communication system comprises a constellation of nongeostationary orbit (NGSO) satellites, said constellation having a periodicity of orbital motion, and wherein step (c) comprises the step of directing movement of said mechanically rotatable base by said antenna unit controller so as to effectuate automatic rotation of said antenna holder in accordance with said periodicity of said constellation.

22. The method as claimed in claim 19, wherein said first antenna unit comprises a transmit antenna unit adapted to transmit radio frequency (RF) signals to said multiple satellites.

23. The method as claimed in claim 19, wherein said first antenna unit comprises a receive antenna unit adapted to receive radio frequency (RF) signals from said multiple satellites.

24. The method as claimed in claim 19, wherein said at least two electronically steerable antenna subunits comprise phased array antennas.

25. The method as claimed in claim 19, further comprising the step of:

(e) electronically tracking said first satellite while said first satellite moves within a projection area of said first electronically steerable antenna subunit.

26. The method as claimed in claim 25, further comprising the step of:

(f) establishing a second communication link with said second satellite through a second electronically steerable antenna subunit while maintaining said first communication link with said first satellite.

27. The method as claimed in claim 26, further comprising the step of:

(g) handing-off communication with said user terminal from said first satellite to said second satellite.

28. A method for operating a rotatable electronically steerable antenna system in a user terminal in a satellite communication system having multiple satellites and at least one user terminal, wherein said antenna system comprises a transmit antenna unit including a mechanically rotatable base, an antenna holder coupled to said first mechanically rotatable base, at least one electronically steerable antenna subunit mounted on said antenna holder, and wherein said user terminal further comprises an antenna unit controller coupled to said transmit antenna unit, the method comprising the steps of:

(a) detecting data to transmit;

(b) acquiring a first mobile satellite within a field of view of said at least one electronically steerable subunit;

(c) establishing a communication link with said first mobile satellite;

(d) transmitting said data to said first mobile satellite;

(e) tracking a direction of motion of said first mobile satellite through said at least one electronically steerable antenna subunit; and (f) mechanically rotating said mechanically rotatable base to continue tracking said first mobile satellite as said first mobile satellite moves toward an outer perimeter of said field of view of said at least one electronically steerable element.

29. A method for operating a rotatable electronically steerable antenna system in a user terminal in a satellite communication system having multiple satellites and at least one user terminal, wherein said antenna system comprises a receive antenna unit including a mechanically rotatable base, an antenna holder coupled to said first mechanically rotatable base, at least one electronically steerable antenna subunit mounted on said antenna holder, and wherein said user terminal further comprises an antenna unit controller coupled to said receive antenna unit, the method comprising the steps of:

(a) detecting data to receive;

(b) acquiring a first mobile satellite within a field of view of said at least one electronically steerable subunit;

(c) establishing a communication link with said first mobile satellite;

(d) receiving said data from said first mobile satellite;

(e) tracking a direction of motion of said first mobile satellite through said at least one electronically steerable antenna subunit;

(f) mechanically rotating said mechanically rotatable base to continue tracking said first mobile satellite as said first mobile satellite moves toward an outer perimeter of said field of view of said at least one electronically steerable element.

30. A method for operating a rotatable electronically steerable antenna system in a user terminal in a first satellite communication system having multiple satellites, wherein said user terminal comprises at least one antenna unit including a mechanically rotatable base, an antenna holder coupled to said mechanically rotatable base, at least two electronically steerable antenna subunits mounted on said antenna holder, and wherein said user terminal also comprises an antenna unit controller coupled to said at least one antenna unit, the method comprising the steps of:

(a) selecting a first satellite within a coverage area of said at least one antenna unit, wherein said first satellite comprises a satellite of said first satellite communication system;

(b) identifying a second satellite within said coverage area, wherein said second satellite comprises a satellite of a second satellite communication system;

(c) directing said antenna unit controller to effectuate a hand-off to a satellite with which communication would not cause interference; and (d) establishing a communication link with a third satellite, wherein said third satellite comprises a satellite of said first communication system.

31. The method as claimed in claim 30, wherein step (c) comprises the step of directing movement of said mechanically rotatable base by said antenna unit controller so as to effectuate rotation of said antenna holder by an amount sufficient to place a non-interfering satellite within a field of view of a first electronically steerable antenna subunit, and wherein step (d) comprises establishing a communication link with said first satellite through said first electronically steerable antenna subunit.

\* \* \* \* \*